United States Patent
Lamine et al.

(10) Patent No.: US 9,482,921 B2
(45) Date of Patent: Nov. 1, 2016

(54) ELECTROCHROMIC DEVICE

(75) Inventors: Driss Lamine, Paris (FR); Philippe Letocart, Raeren (BE); Jean-Christophe Giron, Edina, MN (US); Thomas Bertin-Mourot, Paris (FR)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 425 days.

(21) Appl. No.: 13/820,285

(22) PCT Filed: Jul. 6, 2011

(86) PCT No.: PCT/EP2011/061407
§ 371 (c)(1),
(2), (4) Date: Jul. 16, 2013

(87) PCT Pub. No.: WO2012/007334
PCT Pub. Date: Jan. 19, 2012

(65) Prior Publication Data
US 2013/0286458 A1     Oct. 31, 2013

Related U.S. Application Data

(60) Provisional application No. 61/377,106, filed on Aug. 26, 2010.

(30) Foreign Application Priority Data

Jul. 13, 2010   (FR) .................................... 10 02949

(51) Int. Cl.
G02F 1/155     (2006.01)
G02F 1/153     (2006.01)
G02F 1/15      (2006.01)

(52) U.S. Cl.
CPC ............... *G02F 1/155* (2013.01); *G02F 1/153* (2013.01); *G02F 1/1523* (2013.01)

(58) Field of Classification Search
CPC ............ G02F 1/01; G02F 1/15; G02F 1/153; G02F 1/1533; G02F 1/155
USPC .......... 359/245, 265–275, 290–297; 427/58, 427/96.1–99.5, 126.1–126.6, 160, 162–169, 427/402, 419.1, 419.2, 419.3, 419.4, 419
See application file for complete search history.

(56) References Cited

U.S. PATENT DOCUMENTS

| 4,419,386 A | 12/1983 | Gordon |
| 5,239,406 A | 8/1993 | Lynam |

(Continued)

FOREIGN PATENT DOCUMENTS

| CN | 1510494 A | 7/2004 |
| CN | 101517473 A | 8/2009 |

(Continued)

OTHER PUBLICATIONS

JP2010108684 EPO translation.*

(Continued)

*Primary Examiner* — Ricky Mack
*Assistant Examiner* — Gary O'Neill
(74) *Attorney, Agent, or Firm* — Abel Law Group, LLP; Robert N Young

(57) ABSTRACT

The invention relates to an electrochemical device (100) having electrically controllable optical and/or energy transmission properties comprising a substrate (40), a functional system (60) formed on the substrate and a cover film (56) formed on the functional system. The functional system comprises a bottom electrode coating (46), formed on the substrate, a top electrode coating (54) and at least one electrochemically active film (48, 52) located between the two electrode coatings, the electro-chemically active film being able to switch reversibly between a first state and a second state having optical and/or energy transmission properties different from the first state. The cover film defines at least one surface cavity (66) that passes through the cover film without penetrating the top electrode coating and the device comprises electrical connection means (70) arranged at least partially in at least one surface cavity for electrical contact with the top electrode coating.

27 Claims, 3 Drawing Sheets

(56) References Cited

U.S. PATENT DOCUMENTS

| | | | |
|---|---|---|---|
| 5,321,544 A | 6/1994 | Parkhe et al. | |
| 5,370,775 A | 12/1994 | Parkhe | |
| 5,404,244 A | 4/1995 | Van Dine et al. | |
| 5,657,149 A | 8/1997 | Buffat et al. | |
| 5,659,417 A | 8/1997 | Van Dine et al. | |
| 5,724,175 A * | 3/1998 | Hichwa | G02F 1/1533 359/265 |
| 5,724,177 A | 3/1998 | Ellis, Jr. et al. | |
| 5,755,537 A | 5/1998 | Lubbering | |
| 5,825,526 A | 10/1998 | Bommarito et al. | |
| 6,502,423 B1 | 1/2003 | Ostendarp et al. | |
| 7,372,610 B2 | 5/2008 | Burdis et al. | |
| 7,710,671 B1 | 5/2010 | Kwak et al. | |
| 8,035,882 B2 | 10/2011 | Fanton et al. | |
| 8,506,096 B2 | 8/2013 | McCabe et al. | |
| 2003/0227663 A1 * | 12/2003 | Agrawal | B32B 17/10036 359/265 |
| 2004/0229049 A1 | 11/2004 | Boire et al. | |

FOREIGN PATENT DOCUMENTS

| | | |
|---|---|---|
| CN | 201464764 U | 5/2010 |
| EP | 0253713 A1 | 1/1988 |
| EP | 0382623 A1 | 8/1990 |
| EP | 0408427 A1 | 1/1991 |
| EP | 0518754 A1 | 12/1992 |
| EP | 0521602 A1 | 1/1993 |
| EP | 0532408 A1 | 3/1993 |
| EP | 0575207 A1 | 12/1993 |
| EP | 0612826 A1 | 8/1994 |
| EP | 0670346 A1 | 9/1995 |
| EP | 0825478 A1 | 2/1998 |
| EP | 0831360 A1 | 3/1998 |
| FR | 2781062 A1 | 1/2000 |
| FR | 2829723 A1 | 3/2003 |
| JP | 57-158623 A | 9/1982 |
| JP | S57158623 A | 9/1982 |
| JP | 59-195629 A | 11/1984 |
| JP | 2010108684 A * | 5/2010 |
| WO | 0003290 A1 | 1/2000 |
| WO | 02-06889 A1 | 1/2002 |
| WO | 03098339 A2 | 11/2003 |
| WO | 2005007398 A2 | 1/2005 |
| WO | 2009148861 A2 | 12/2009 |

OTHER PUBLICATIONS

Chinese Office Action for Application No. 201180044447.3 dated Jul. 2, 2014.

Wei Hongli et al., "New Progress of Study on Inorganic Electrochromic glass", Glass, No. 1, Feb. 28, 2006, pp. 34-37 (English summary provided).

International Search Report for Application No. PCT/EP2011/060363 dated Sep. 22, 2011.

International Search Report for Application No. PCT/EP2011/061407 dated Sep. 27, 2011.

International Search Report for Application No. PCT/EP2011/061408 dated Oct. 10, 2011.

International Written Opinion for Application No. PCT/EP2011/060363 dated Sep. 22, 2011.

International Written Opinion for Application No. PCT/EP2011/061408 dated Oct. 10, 2011.

* cited by examiner

ELECTROCHROMIC DEVICE

CROSS REFERENCE OF RELATED APPLICATIONS

The present application is a national phase entry under 35 U.S.C. §371 of International Application No. PCT/EP2011/061407 filed Jul. 6, 2011, published in English, which claims priority from French Patent Application No. 10/02949 filed Jul. 13, 2010, and U.S. Provisional Application No. 61/377,106 filed Aug. 26, 2010, all of which are incorporated herein by reference.

BACKGROUND

The present invention relates to the field of electrochemical devices having electrically controllable optical and/or energy transmission properties.

These are devices certain characteristics of which may be modified using an appropriate source of electrical power, most particularly the transmission, absorption and reflection of certain wavelengths of electromagnetic radiation, particularly in the visible and/or in the infrared. Transmission is generally varied in the optical (infrared, visible and ultraviolet range) and/or in other ranges of the electromagnetic spectrum, hence the device is said to have variable optical and/or energy transmission properties, the optical range not necessarily being the only range concerned.

From the thermal standpoint, glazing whose transmission/absorption/reflection may be varied within at least part of the solar spectrum allows the solar heat influx into rooms or passenger areas/compartments to be controlled when it is fitted as the external glazing in buildings or as windows in transportation means of the type comprising automobiles, trains, airplanes, etc., and thus it allows excessive heating of the latter to be prevented should there be strong sunlight.

From the optical standpoint, the glazing allows the degree of vision to be controlled, thereby making it possible, when it is mounted as exterior glazing, to prevent glare should there be strong sunlight. The glazing may also have a particularly advantageous shutter effect.

RELATED ART

FIG. 1 illustrates a device 1 equipped with a functional electrochromic system 2 of the all-solid-state type, that is to say that all the films of the functional system have sufficient mechanical strength to be deposited on one and the same substrate 4 and to adhere to said substrate. This is because the films of the electrochromic system 2 are for example inorganic or made of certain organic materials that have sufficient mechanical strength, such as PEDOT.

More particularly, by way of example, this system 2 comprises:
 an alkali barrier film 8 made of $SiO_2$;
 a bottom electrode coating 10 formed on the substrate 4 and made, for example, from a film of $SnO_2$:F, ITO or an Ag-based multilayer;
 a cathodic type first electrochromic film 12, namely, for example, a film of tungsten oxide into which lithium ions are inserted ($WO_x$:Li);
 an electrolyte film 14 for example made of tantalum oxide;
 a anodic type second electrochromic film 16 for example made of a tungsten-doped nickel oxide ($NiWO_x$); and
 a top electrode coating 18 formed on the second electrochromic film 16 and consisting, for example, of a film of an ITO (tin-doped indium oxide) or an Ag-based multilayer.

The device 1 illustrated furthermore comprises:
 an electrically insulating cover film 20, for example made of $SiO_2$, of the electrochromic system 2, the film 20 here acting as a moisture protection film, protecting the functional system 2 from moisture, and as an antireflection coating;
 a first strip 24 for connecting the bottom electrode coating 10, placed directly on the latter; and
 a second strip 26 for connecting the top electrode coating 18, placed on an inactive region 10B of the bottom electrode coating 10, the top electrode coating 18 being, in part, deposited onto the strip 26.

It should be noted that the drawing is clearly not to scale, the strips 24 and 26 and the substrate 4 having thicknesses of the order of a millimeter whereas the set of films 8, 10, 12, 14, 16, 18 and 20 have a thickness of the order of a micron.

The region of the bottom electrode coating 10 on which the strip 24 is placed is for example obtained by placing a mask on the bottom electrode coating 10 during the deposition of the films 12, 14, 16, 18 and 20, hence the strip 24 may be positioned directly on the coating 10 after the deposition of the films 14, 16, 18 and 20.

The strip 24 may also be placed after deposition of the bottom electrode coating 10 and before deposition of the other films by protecting it with a mask during the deposition of the these other films.

As for the strip 26, this is placed on a region 10B of the bottom electrode coating 10 that has been isolated from the rest of the coating 6 by laser ablation of the coating along the length of this region 10B. The ablation is carried out before the deposition of the first electrochromic film 12 so that the film 12, which is electronically insulating, fills the cavity 28 formed by the laser ablation.

A mask is partially placed above the strip 26 during the deposition of the films 12, 14, 16, 18 and 20 and gradually removed so that a part of the top electrode coating 18 is deposited directly and is therefore in contact with the connection strip 26.

Nevertheless, such a device has the drawback of being relatively expensive to fabricate.

SUMMARY OF THE INVENTION

The object of the invention is to provide an electrochemical device having electrically controllable optical and/or energy transmission properties that costs less to fabricate.

For this purpose, one subject of the invention is an electrochemical device having electrically controllable optical and/or energy transmission properties and comprising:
 a substrate;
 a functional system formed on the substrate comprising:
  a bottom electrode coating formed on the substrate;
  a top electrode coating formed on the bottom electrode coating; and
  at least one electrochemically active film located between the bottom electrode coating and the top electrode coating, the at least one electrochemically active film being able to switch reversibly between a first state and a second state having optical and/or energy transmission properties different from the first state when electrical power is applied to the terminals of the bottom electrode coating and the top electrode coating; and a cover film formed on the functional system in which the cover film defines at least one surface cavity that passes through the cover film without penetrating the top electrode coating and in which the device comprises electrical connection means arranged at least partially in at least one surface cavity for electrical contact with the top electrode coating.

Such a device have the advantage of allowing the electrical connectors to be positioned after the deposition of all the films, including the cover film. It thus becomes possible to obtain the device by cutting a motherboard.

The connectors are either placed on the motherboard before cutting, or placed after the cutting on the cut substrates. In both cases, the motherboard may be fabricated on another production site and stored for an indeterminate period of time before cutting, thus for example offsetting the seasonal demand for fitting windows/curtain walls.

Furthermore, any suitable device size may be obtained by cutting a single-sized motherboard.

These combined features thus result in greater flexibility in the production line and potential cost reductions.

Particular embodiments of the device according to the invention furthermore comprise one or more of the following technical features, applied in isolation or in any technically possible combination:

the at least one surface cavity is obtained by laser ablation;

the electrical connection means comprise a conducting ink that is flowed into the at least one surface cavity;

the cover film and the functional system together define at least one partial cavity passing through the cover film and the top electrode coating without penetrating the bottom electrode coating, the at least one partial cavity separating the top electrode coating into at least two electrically isolated regions, namely a free region and an active region which is able to control the functional system;

the device comprises at least one bottom electrode electrical connector arranged in the free region of the top electrode coating for electrical contact with the bottom electrode coating;

the bottom electrode electrical connector is arranged on the cover film and soldered through all the films down to the substrate;

the cover film and the functional system together define a total cavity passing through all the films at least down to the bottom electrode coating inclusive, separating the bottom electrode film into at least two electrically isolated regions, namely a free region and an active region which is able to control the functional system;

the device comprises at least one top electrode electrical connector arranged in the free region of the top electrode coating for electrical contact with the top electrode coating;

the electrode electrical connector is arranged on the cover film and soldered, preferably ultrasonically soldered, through all the films down to the substrate;

the top electrical connector is electrically connected to said connection means arranged in the at least one surface cavity;

the cover film is electrically insulating;

the cover film is based on $SiO_2$;

the functional system is an all-solid-state system, all the films of the functional system being formed on the substrate; and the functional system is an electrochromic system, the system comprising a first electrochromic film capable of switching from the first state to the second state by insertion/removal of ions, an electrochemically active ion storage film for storing the same ions by insertion/removal, the ion storage film preferably being electrochromic and thus forming a second electrochromic film, and an electrolyte film between the first electrochromic film and the ion storage film, the electrolyte film providing the mobility of the insertion ions between the first electrochromic film and the ion storage film.

Another subject of the invention is glazing comprising a device as described above, the substrate being a sheet providing the glazing with a glass function.

Another subject of the invention is a process for fabricating an electrochemical device with electrically controllable optical and/or energy transmission properties, comprising steps consisting in:

depositing a bottom electrode coating onto a substrate;

depositing at least one electrochemically active film onto the bottom electrode coating;

depositing a top electrode coating onto at least one electrochemically active film, the at least one electrochemically active film being capable of switching reversibly between a first state and a second state having optical and/or energy transmission properties different from the first state when electrical power is applied to the terminals of the bottom electrode coating and top electrode coating;

depositing a cover film onto the functional system;

carrying out an ablation of the material of the cover film so as to form at least one surface cavity that passes through the cover film without penetrating the top electrode coating; and adding electrical connection means arranged at least partially in at least one surface cavity for electrical contact with the top electrode coating.

Particular embodiments of the fabrication process according to the invention furthermore comprise one or more of the following technical features, applied in isolation or in any technically possible combination:

the ablation is a laser ablation;

a step of printing the electrical connection means by injecting a conducting ink into the at least one surface cavity;

a step of ablating the material of the cover film and the top electrode coating so that the cover film and the functional system together define at least one partial cavity passing through the cover film and the top electrode coating without penetrating the bottom electrode coating, the at least one partial cavity separating the top electrode coating into at least two electrically isolated regions, namely a free region and an active region which is able to control the functional system;

a step of depositing at least one bottom electrode electrical connector in the free region of the top electrode coating for electrical contact with the bottom electrode coating;

the bottom electrode electrical connector is arranged on the cover film and soldered through all the films down to the substrate;

a step of ablating the material of all the films at least down to the bottom electrode coating inclusive so that the cover film and the functional system together define a total cavity passing through all the films at least down to the bottom electrode coating inclusive, separating the bottom electrode film into at least two electrically isolated regions, namely a free region and an active region which is able to control the functional system;

placing at least one top electrode electrical connector arranged in the free region of the top electrode coating for electrical contact with the top electrode coating;

the electrical connector is arranged on the cover film and soldered, preferably ultrasonically soldered, through all the films down to the substrate;

the top electrical connector is electrically connected to said connection means arranged in the at least one surface cavity;

the cover film is electrically insulating;

the cover film is based on $SiO_2$;

the functional system is an all-solid-state system, all the films of the functional system being deposited on the substrate; and the functional system is an electrochromic system, the system being formed by deposition of a first electrochromic film capable of switching from the first state to the second state by insertion/removal of ions, an electrochemically active ion storage film for storing the same ions by insertion/removal, the ion storage film preferably being electrochromic and thus forming a second electrochromic film, and an electrolyte film between the first electrochromic film and the ion storage film, the electrolyte film providing the mobility of the insertion ions between the first electrochromic film and the ion storage film.

BRIEF DESCRIPTION OF THE DRAWINGS

The invention will be better understood on reading the following description, given merely by way of example and with reference to the appended drawings including FIGS. 1 to 9, FIGS. 2 to 7 of which illustrate the process for obtaining the device illustrated in FIG. 8.

FIGS. 2, 3, 5, 7, and 8 are schematic cross-sectional views whereas

FIG. 2 includes an illustration that corresponds to a cross-sectional view of the substrate equipped with films of the functional system and of the cover film before laser ablation.

FIG. 3 includes an illustration that corresponds to a cross-sectional view along the line III-III in FIG. 4.

FIG. 4 includes an illustration that corresponds to a schematic top view of cavities passing through the thickness of films deposited on the substrate.

FIG. 5 corresponds to a cross-sectional view along the line V-V in FIG. 6.

FIG. 6 includes an illustration that corresponds to a schematic top view of cavities perpendicular to the cavities illustrated in FIG. 4.

FIG. 7 includes an illustration that corresponds to a cross-sectional view along the line V-V in FIG. 6 after electrical connection means have been positioned.

FIG. 8 includes an illustration that corresponds to a cross-sectional view along line VIII-VIII in FIG. 9.

FIG. 9 includes an illustration that corresponds to a top view of connectors for connecting electrode coatings.

The drawings are of course not to scale, so as to be readable.

DETAILED DESCRIPTION

Figure 1:
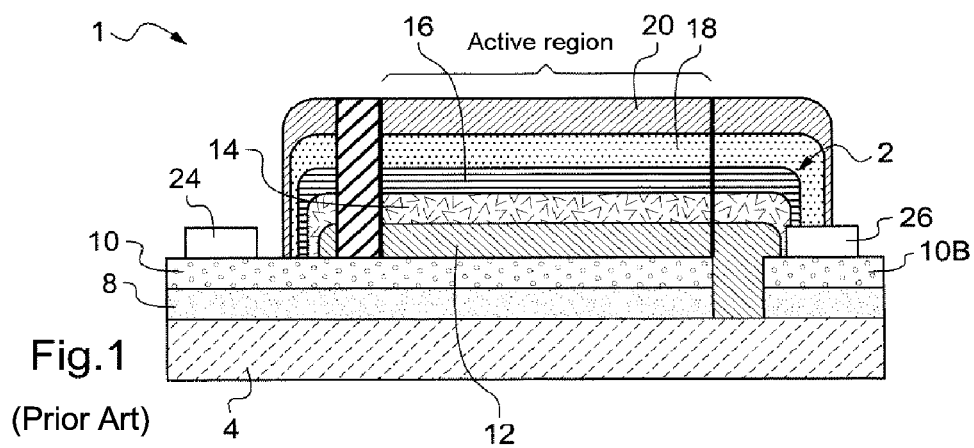
FIG. 1 includes an illustration that corresponds to a conventional electrochromic device.
Figure 2:
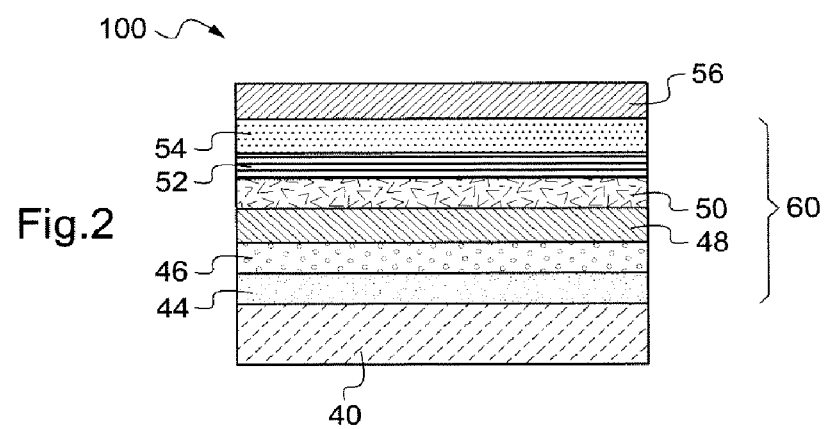

FIG. 1 illustrates a device 100 comprising a substrate 40 on which have been deposited:

an alkali barrier film 44;

a bottom electrode film 46;

a first electrochromic film 48 formed on the bottom electrode coating 46;

an electrolyte film 50 formed on the first electrochromic film 48;

a second electrochromic film S2 formed on the electrolyte film 50;

a top electrode coating 54 formed on the second electrochromic film 52; and a cover film 56 formed on the top electrode coating 54.

The expression "a film A formed (or deposited) on a film B" should be understood throughout the text to mean a film A formed either directly on the film B and therefore in contact with the film B or formed on the film B with one or more films interposed between the film A and the film B.

The substrate 40 thus illustrated is for example obtained by cutting a motherboard onto which the films 44, 46, 48, 50, 52 and 54 have been deposited beforehand.

The films 44, 46, 48, 50, 52 and 54 form an all-solid-state electrochromic system 60, that is to say all the films of which are deposited onto the same substrate 40.

As a variant, the system 60 is not electrochromic, that is to say a system the optical transmission (absorption and/or reflection) of which is reversibly controlled by electrically controlled oxidation/reduction of the films, but for example thermochromically.

Generally, the system is an all-solid-state electrochemical functional system 60.

The expression "cover film" is understood to mean a film formed on the functional system 60. The existence of intermediate films between the cover film 56 and the system 60 is not ruled out. The cover film 56 is not necessarily the last film deposited onto the substrate 40 and may be covered with other films.

In the example illustrated, the cover film 56 covers the whole of the functional system 60. More generally, the cover film 56 at least partially covers the functional system 60 at least in its active part, preferably the whole of its active part is covered.

The cover film 56 is for example electrically insulating.

The expression "electrically insulating" is of course a relative expression because a zero conductivity is not required. This means that the cover film 56 has a resistivity greater than all the films of the functional system 60.

In the example illustrated, the cover film 56 acts as a moisture barrier film preventing water molecules from penetrating into the functional system 60, which would damage the system 60.

The cover film 56 also acts as an antireflection coating by virtue of a refractive index that is intermediate between that of the media located directly above and below the film 56.

The cover film 56 is for example made of a ceramic, for example $SiO_2$. It has for example a thickness of between 10 and 300 nm.

As a variant, there are several cover films 56.

It is of course the same for the electrode coatings, the electrochromic materials and the electrolyte which may, as a variant, be made of a number of films of any suitable type.

The expression "comprises a film" should in fact be understood to have a broad meaning that does not exclude there being two or more films.

The alkali barrier film 44 is for example made of $SiO_2$ or another material of any type able to present a barrier to the alkali metals present in the substrate 40 and thus prevent damage to the bottom electrode coating 46. Furthermore, the film 44 plays a role as a tie film because of its good adhesion to the substrate 40.

The bottom electrode coating 46 is made of a film of $SnO_2$:F. The coating 46 has a suitable thickness such that its resistance per square is less than or equal to 20 Ω/□, for example a thickness of between 50 nm and 1 micron.

Generally, the bottom electrode coating 46 and the top electrode coating 54 are produced from materials of any suitable type and each coating has a resistance per square of less than or equal to 20 Ω/□.

The upper electrode coating 54 is for example made of ITO, for example with a thickness of between 50 nm and 1 micron.

The top electrode coating 54 has a resistance per square less of than or equal to 20 Ω/□.

The first electrochromic film 48 is for example of the cathodic type, for example a film of tungsten oxide into which lithium ions are inserted during the deposition to form $WO_x$:Li, or a film of tungsten oxide onto the surface of which film 48 lithium ions are deposited. As a variant, any suitable electrochromic material may be used.

The second electrochromic film 52 is anodic if the first electrochromic film 48 is cathodic and is cathodic if the first electrochromic film 48 is anodic. In the present example, it is made of a tungsten-doped nickel oxide ($NiWO_x$). As a variant, an electrochromic material of any suitable type may be used, for example a film of $IrO_x$.

The films 48 and 52 given in the above example act by varying the absorption coefficient.

As a variant, the film 48 and/or the film 52 are made of an electrochromic material that acts by varying the reflection coefficient. In this case, at least one of the films is based on the rare earths (yttrium or lanthanum) or an Mg/transition metal alloy or a metalloid (like Sb whether doped or not, for example doped with Co, Mn, etc.). The other film may be an electrochromic film that acts by varying the absorption coefficient as above (made of $WO_3$ for example) or simply a nonelectrochromic ion storage film.

Furthermore, one of the two films 48 and 52 is not necessarily electrochromic, that is to say that its optical properties do not vary significantly. The two films are generally, in the case of an electrochromic system, an electrochromic film and a ion storage film for storing the insertion ions, which ion storage film is optionally electrochromic. An example of a nonelectrochromic ion storage material is $CeO_2$ (cerium oxide).

The electrolyte film 50 is made of any suitable material able to provide the mobility of the insertion ions, while still being electronically insulating.

The electrolyte film may for example be a film of $Ta_2O_5$ having a thickness of between 1 nm and 1 micron, for example between 100 nm and 400 nm.

The insertion ions are preferably $Li^+$ ions in the case of the aforementioned electrochromic films. As a variant, $H^+$ ions or $Na^+$, $K^+$ or other alkali-metal ions may be used in the case of electrochromic systems.

The substrate 40 is a sheet providing a glass function.

The sheet may be flat or curved and be of any size, in particular having at least one dimension that is longer than 1 meter.

The sheet may advantageously be a sheet of glass.

The glass is preferably soda-lime-silica glass, but other types of glass like borosilicate glass may also be used. The glass may be clear or extra-clear or even tinted, for example tinted blue, green, amber, bronze or gray.

The thickness of the glass sheet is typically between 0.5 mm and 19 mm, particularly between 2 mm and 12 mm, even between 4 mm and 8 mm, but preferably 1.6 mm. The sheet of glass may also be film glass of thickness greater than or equal to 50 μm (in this case, the multilayer EC and the electrode coatings TCO/TCC are deposited using, for example, a roll-to-roll process).

As a variant, the substrate 40 is produced from a transparent, flexible material, for example from a plastic.

The substrate 40 illustrated in FIG. 1 was obtained by depositing various films onto a motherboard and cutting the substrate 40 from the motherboard, for example using thermal cutting, for example laser cutting, or using mechanical cutting.

Figure 3:
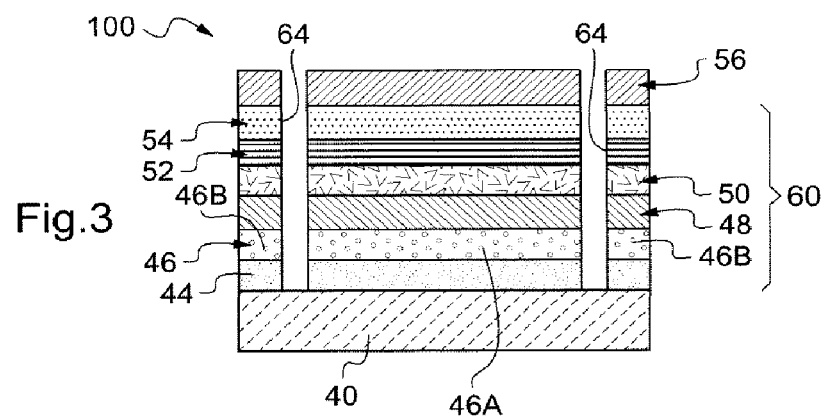
Figure 4:
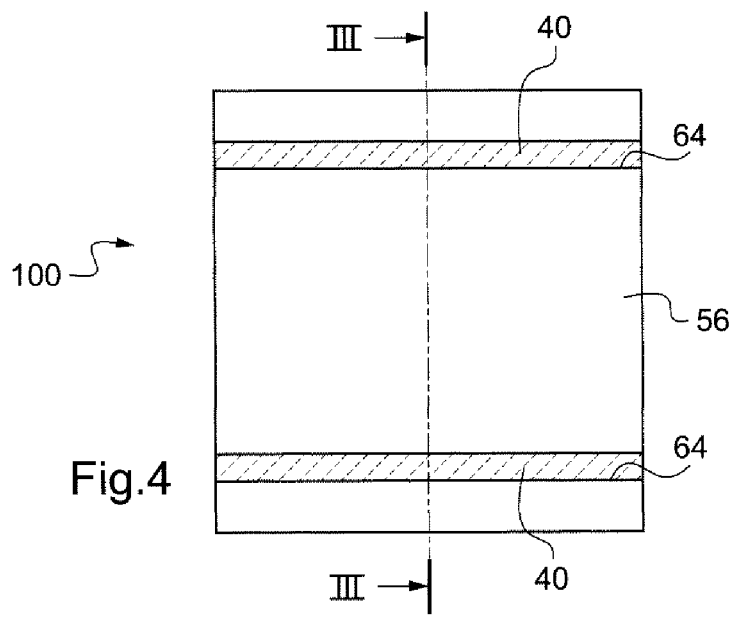
FIGS. 4, 6, and 9 are schematic top views.

As illustrated in FIGS. 3 and 4, two cavities 64 called "total" cavities pass through the thickness of all the films deposited on the substrate 40.

As a variant however, the alkali barrier film 44 is not penetrated.

Generally, at least one total cavity 64 passes through, in particular, the cover film 56 and the bottom electrode coating 46 so that the bottom electrode coating is separated into two electrically isolated regions, namely an active region 46A able to control the functional system 60 and an inactive region 46B.

The cavities 64 have for example a width of between 1 micron and 1 cm and preferably between 100 microns and 1 mm. They are for example obtained by thermal ablation, for example laser ablation, or by mechanical ablation.

In the example illustrated, the cavities 64 are two parallel straight trenches placed near two opposite edges of the substrate 40, respectively.

As a variant, the cavities might be for example a single cavity 64 that forms a trench, for example a straight trench, near one edge of the substrate, or even a cavity forming a frame, for example a rectilinear frame, that runs alongside the four edges of the substrate over their entire length, thus defining a central active region and a peripheral inactive region that surrounds the central region.

Placing the electrical connectors of the top electrode coating 54 on the inactive region 46B does not create a short-circuit, as explained in more detail below.

Figure 5:
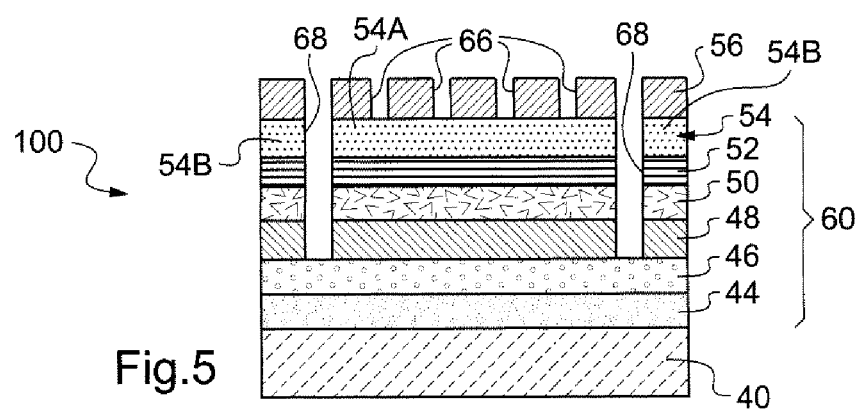
Figure 6:
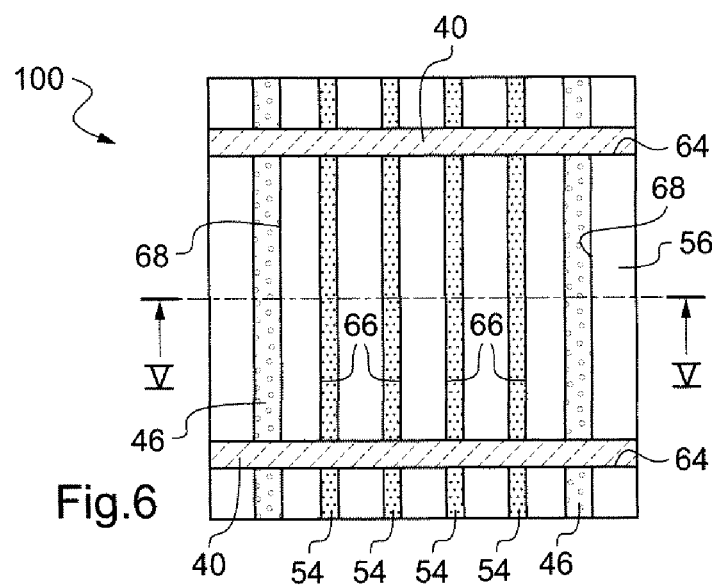

As illustrated in FIGS. 5 and 6, the substrate 40 then undergoes other ablations that form cavities 66, 68 perpendicular to the cavities 64.

These cavities so formed are of two types: cavities called surface cavities 66 and cavities called partial cavities 68.

The partial cavities 68 have a function analogous to that of the cavities 64. They particularly pass through the cover film 56 and the top electrode coating 54 but do not pass through the bottom electrode coating 46.

Here, two cavities form straight trenches alongside two edges, perpendicular to the edges of the cavities 64, which trenches run the entire length of these edges. The cavities 68 have for example a width of between 1 micron and 1 cm and preferably between 100 microns and 1 mm. They are for example obtained by thermal ablation, for example laser ablation.

In the same way as for the cavities 64, the partial cavities 68 may, as a variant, be of any suitable number and pattern so as to electrically isolate the top electrode coating 54 into two electrically isolated regions, namely an active region 54A, able to control the functional system in combination with the active region 46A of the bottom electrode coating 46, and an inactive region 54B.

As a variant, these trenches might for example be a single trench, for example a straight trench.

Placing the electrical connection means of the bottom electrode coating 46 on the inactive region 54B does not create a short-circuit.

The inactive region 54B is arranged so as to at least partially face the active region 46A of the bottom electrode coating 46 so that the connectors of the bottom electrode coating 46 may be simultaneously placed in both these regions and thus soldered through all the films without creating a short-circuit—this is explained in more detail below.

The active region 54A is arranged so as to face the inactive region 46B of the electrode coating 46 for the same reasons as those relating to the connectors of the top electrode coating 54.

Figure 7:
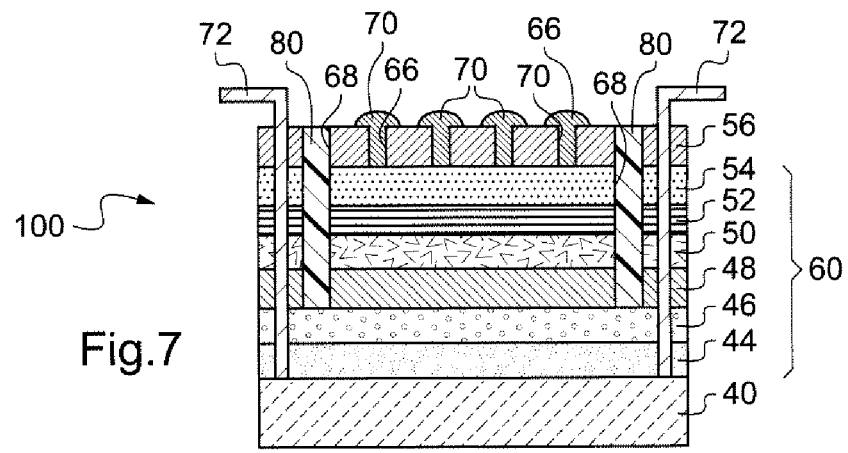

The surface cavities 66 pass through the cover film 56 without penetrating the top electrode coating 54. As illustrated in FIG. 7, the cavities 66 are intended to receive the electrical connection means 70 of the top electrode coating 54.

In the example illustrated, there are four cavities 66 forming straight trenches parallel to the cavities 68 and located between the latter. They extend along the entire length of the edges.

As a variant, the cavities 66 are of course of any suitable number and pattern that allows electrical contact with the top electrode coating 54.

Generally, the surface cavities 66 extend at least into the active region 54A of the top electrode coating 54 so as to allow electrical contact with the latter in this region 54A and thus allow the functional system 60 to be controlled via the electrical connection means 70.

The cavities 66 have for example a width of between 1 micron and 1 mm. They are for example obtained by pulsed laser ablation or by plasma etching.

The electrical connection means 70 illustrated are for example obtained by inkjet printing.

As a variant, the electrical connection means might be metal wires arranged in the cavities 66 or any other suitable means, such as metal strips.

Figure 8:
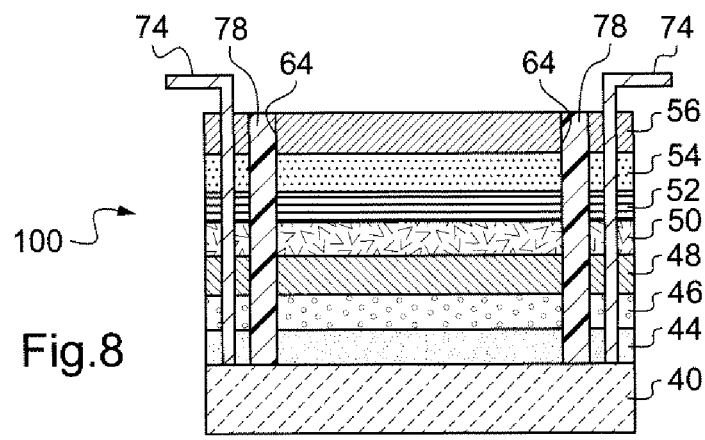
Figure 9:
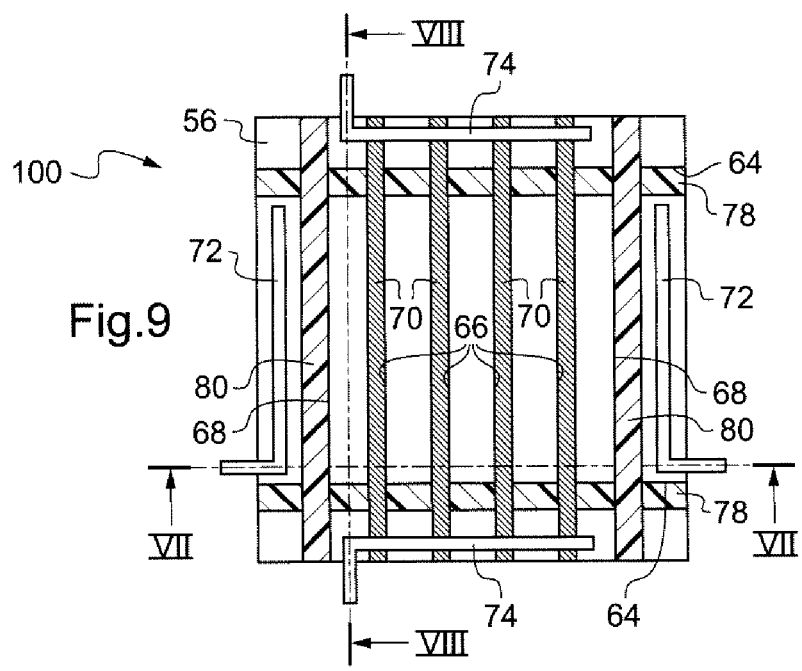

FIGS. 7 to 9 illustrate the connectors 72, 74 for connecting the electrode coatings 46, 54.

The connectors 72 are the connectors of the bottom electrode coating 46.

The connectors 74 are the connectors of the top electrode coating 54.

The connectors 72 are for example metal strips or bands soldered to the substrate 40. They may for example be ultrasonically soldered.

Because the various films are very thin, any soldering of the connectors 72, 74 perforates the films and short-circuits the bottom and top electrode coatings 46 and 54. Thus, the connectors 72, 74 are placed in regions corresponding to an active region 46A, 54A of one of the two coatings 46, 54, but in an inactive region 54B, 46B of the other of the electrode coatings 54, 46.

It should be noted that an electrical insulator 78 advantageously fills the cavities 64 so that the conducting ink 70 can be printed as far as the connectors 74 without creating a short-circuit with the bottom electrode coating 46. Furthermore, this has the advantage of protecting the functional system 60.

To fulfill its anti-short-circuit function, the insulator 78 fills the cavities 68 at least beneath the connection means 70 and at least as far as the first electrochromic film 48.

The insulator 78 advantageously fills the cavities 64 along the entire length of the active region 54A and advantageously, furthermore, at least partially fills the inactive region 54B, particularly when the connection means 70 are printed.

In the figures, the insulator 78 fills the entire area and entire thickness of the cavities 68.

The insulator may for example be $SiO_2$ deposited into the cavities 64 by printing. It may, more generally be $SiO_x$, $Si_xN_y$, $Si_xO_yN_z$, or some combination of these.

In the case of metal wires however, it is possible to place the wires between the active region 54A and the connectors 74 without creating a short-circuit, so that the insulator 78 in the cavities 66 is no longer necessary, even though it preferably remains in place to protect the functional system 60.

It should be noted that the cavities 64 are optional since, for example, it is possible as a variant to establish an electrical connection with the top electrode coating 52 by bonding a metal band to the electrical connection means 70.

In this variant, a busbar having a conductive adhesive face is bonded directly to the electrical connection means 70, making the cavities 64 redundant.

In this case, the cavities 64 may nevertheless be replaced with partial cavities of the same type as the cavities 68, so as to limit the risk of a short-circuit.

The busbar may take any suitable form and particularly the form of a frame that covers as best as possible the entire area of the active region 54A.

Another possible advantage of this variant, in which there is no total cavity 64, is that four connectors 72 may be placed on the four edges of the device. In this case, an electrically insulating band will for example be provided between the busbar and the connectors at their intersection.

According to another advantageous variant, an additional total cavity runs alongside the edges of the substrate around the entire circumference of the substrate so as to prevent any short-circuiting by contact of a conducting element with the edges. This cavity is advantageously produced in the immediate vicinity of the edges so that the active area of the functional system 60 is not overly reduced.

A second electrical insulator 80 fills the cavities 68, advantageously at least along the entire length of the active region 54A, with the aim of protecting the functional system 60.

This second insulator may be for example a material, for example $SiO_2$, deposited into the cavity 68 by printing.

The device according to the invention therefore has many advantages.

As explained hereinabove, the device has the advantage of allowing the electrical connectors to be positioned after the deposition of all the films, including the cover film. It thus becomes possible to obtain the device by cutting a motherboard.

The connectors are either placed on the motherboard before cutting or placed after cutting on the cut substrates. In both cases, the motherboard may be fabricated in another production site, stored for an indeterminate period of time, etc., before being cut.

Furthermore, any suitable device size may be obtained by cutting a single-sized motherboard.

The invention claimed is:

1. An electrochemical device having at least one of electrically controllable optical or energy transmission properties comprising:
   a substrate;
   a functional system formed on the substrate and comprising:
      a bottom electrode coating formed on the substrate;
      a top electrode coating formed on the bottom electrode coating; and
      at least one electrochemically active film located between the bottom electrode coating and the top electrode coating, the at least one electrochemically active film being able to switch reversibly between a first state and a second state having optical and/or energy transmission properties different from the first state when electrical power is applied to the terminals of the bottom electrode coating and the top electrode coating,
      wherein the electrochemically active film is disposed immediately adjacent to and does not extend into the bottom electrode coating; and
   a cover film formed on the functional system in which the cover film defines at least one surface cavity that passes through the cover film without fully penetrating the top electrode coating and in which the device comprises electrical connection means arranged at least partially in at least one surface cavity for electrical contact with the top electrode coating.

2. The device of claim 1, wherein the at least one surface cavity forms a trench.

3. The device of claim 2, wherein the trench is straight.

4. The device of claim 1, wherein the at least one surface cavity is obtained by laser ablation.

5. The device of claim 1, wherein the electrical connection means (70) comprises a conducting ink that fills the at least one surface cavity.

6. The device of claim 1, wherein the cover film and the functional system together define at least one partial cavity passing through the cover film and the top electrode coating without penetrating the bottom electrode coating, the at least one partial cavity separating the top electrode coating into at least two electrically isolated regions, namely a free region and an active region which is able to control the functional system.

7. The device of claim 6, further comprising at least one bottom electrode electrical connector arranged in the free region of the top electrode coating for electrical contact with the bottom electrode coating.

8. The device of claim 7, wherein the bottom electrode electrical connector is arranged on the cover film and soldered through all the films down to the substrate.

9. The device claim 1, wherein the cover film and the functional system together define a total cavity passing through all the films at least down to the bottom electrode coating inclusive, separating the bottom electrode coating into at least two electrically isolated regions.

10. The device of claim 9, further comprising at least one top electrode electrical connector arranged in the free region of the top electrode coating for electrical contact with the top electrode coating.

11. The device of claim 10, wherein the top electrode electrical connector is arranged on the cover film and soldered, through all the films down to the substrate.

12. The device of claim 10, wherein the top electrode electrical connector is electrically connected to said connection means arranged in the at least one surface cavity.

13. The device of claim 1, wherein the entire at least one surface cavity passes through the cover film.

14. The device of claim 11, wherein the cover film comprises a material selected from the group consisting of $SiO_x$, $Si_xN_y$, $Si_xO_yN_z$ or some combination of these, and wherein x, y, and z are integers.

15. The device of claim 1, wherein the functional system is an all-solid state system, all the films of the functional system being formed on the substrate.

16. The device of claim 15, wherein the functional system is an electrochromic system, the system comprising a first electrochromic film capable of switching from the first state to the second state by at least one of insertion or removal of ions, an electrochemically active ion storage film for storing the same ions by at least one of insertion or removal, and an electrolyte film between the first electrochromic film and the ion storage film, the electrolyte film providing the mobility of the insertion ions between the first electrochromic film and the ion storage film.

17. The device of claim 1, wherein the functional system extends over all of the visible surface of the device.

18. The device of claim 17, wherein the functional system extends from each edge to the opposite edge of the surface.

19. A glazing comprising the device of claim 1, wherein the substrate comprises glass.

20. A process for fabricating an electrochemical device having at least one of electrically controllable optical or energy transmission properties, comprising the steps of:
   depositing a bottom electrode coating onto a substrate;
   depositing at least one electrochemically active film onto the bottom electrode coating, wherein the at least one electrochemically active film contacts and does not penetrate the bottom electrode coating;
   depositing a top electrode coating onto at least one electrochemically active film, the at least one electrochemically active film being capable of switching reversibly between a first state and a second state having optical and/or energy transmission properties different from the first state when electrical power is applied to the terminals of the bottom electrode coating and top electrode coating;
   depositing a cover film onto the top electrode coating;
   carrying out an ablation of the material of the cover film so as to form at least one surface cavity that passes through the cover film without fully penetrating the top electrode coating; and
   adding electrical connection means arranged at least partially in at least one surface cavity for electrical contact with the top electrode coating.

21. The process of claim 20, wherein the coatings, the active films and the cover film are sputter deposited.

22. The process of claim 20, wherein, after deposition of at least the active film, the substrate is cut into pieces so as to form several devices with at least several of the pieces.

23. The device of claim 5, wherein the ink is a thick film silver ink.

24. The device of claim 20, wherein the entire at least one surface cavity passes through the cover film without fully penetrating the top electrode.

25. The device of claim 9, wherein the two electrically isolated regions are a free region and an active region.

26. The device of claim 11, wherein the film is ultrasonically soldered.

27. The process of claim 21, wherein each of the coatings, active films, and cover film is sequentially deposited on the surface of the substrate.

* * * * *